United States Patent
Hogan et al.

(10) Patent No.: US 9,626,067 B2
(45) Date of Patent: Apr. 18, 2017

(54) MODIFYING POSITIONS OF ON-CANVAS OBJECTS

(71) Applicant: APPLE INC., Cupertino, CA (US)

(72) Inventors: Edward P. Hogan, Pittsburgh, PA (US); Matthew R. Lehrian, Pittsburgh, PA (US); Zachariah N. Paine, Pittsburgh, PA (US); Marek R. Telgarsky, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 736 days.

(21) Appl. No.: 13/712,673

(22) Filed: Dec. 12, 2012

(65) Prior Publication Data
US 2014/0164992 A1    Jun. 12, 2014

(51) Int. Cl.
G06F 3/0484    (2013.01)
G06F 3/0481    (2013.01)
G06F 17/24    (2006.01)

(52) U.S. Cl.
CPC .......... G06F 3/0481 (2013.01); G06F 17/245 (2013.01); G06F 2203/04806 (2013.01)

(58) Field of Classification Search
CPC .... G06F 3/0484; G06F 17/246; G06F 3/0481; G06F 17/245; G06F 2203/04806
USPC .......................................... 715/212, 215, 800
See application file for complete search history.

(56) References Cited

U.S. PATENT DOCUMENTS

| | | | |
|---|---|---|---|
| 6,046,740 A | 4/2000 | LaRoch et al. | |
| 6,573,903 B2 | 6/2003 | Gantt | |
| 6,738,079 B1* | 5/2004 | Kellerman et al. | 715/763 |
| 7,149,967 B2 | 12/2006 | Pollock et al. | |
| 7,237,188 B1* | 6/2007 | Leung | 715/209 |
| 7,477,263 B2 | 1/2009 | Saillet et al. | |
| 2001/0001857 A1* | 5/2001 | Kendall et al. | 707/501 |
| 2004/0143788 A1* | 7/2004 | Aureglia et al. | 715/503 |
| 2004/0181645 A1 | 9/2004 | Wright et al. | |
| 2004/0205624 A1* | 10/2004 | Lui et al. | 715/525 |
| 2005/0066265 A1* | 3/2005 | Kotler et al. | 715/503 |
| 2005/0068290 A1* | 3/2005 | Jaeger | 345/156 |
| 2005/0108620 A1* | 5/2005 | Allyn et al. | 715/500 |
| 2006/0117255 A1* | 6/2006 | Seeler | 715/520 |
| 2007/0188518 A1 | 8/2007 | Vale et al. | |
| 2009/0245654 A1 | 10/2009 | Xing et al. | |
| 2010/0153841 A1* | 6/2010 | Haug et al. | 715/244 |
| 2010/0257439 A1* | 10/2010 | Xue et al. | 715/217 |
| 2011/0164813 A1 | 7/2011 | Enomoto | |
| 2011/0179350 A1* | 7/2011 | Capela et al. | 715/244 |
| 2013/0117653 A1* | 5/2013 | Sukhanov et al. | 715/227 |

* cited by examiner

*Primary Examiner* — Jennifer To
*Assistant Examiner* — John Repsher, III
(74) *Attorney, Agent, or Firm* — Fletcher Yoder PC

(57) ABSTRACT

Approaches are disclosed for maintaining spatial relationships (i.e., a layout) between a table object and other objects placed on a virtual canvas of an application work space. In certain implementations, offsets between the other objects and the table object are initially determined and are used to maintain the spatial relationships when the table object is resized. In certain implementations, the movement of the objects in response to a resize of the table object is dynamic from the user's perspective and can be easily undone.

24 Claims, 13 Drawing Sheets

MODIFYING POSITIONS OF ON-CANVAS OBJECTS

BACKGROUND

The present disclosure relates generally to the placement and movement of on-canvas objects using a processor-implemented application, such as a productivity application.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In various computer-implemented applications, such as productivity programs, it may be possible for a user to set-up or design a displayed work space to convey particular information. Examples of such applications may include word processing programs, spreadsheet programs, presentation programs, and so forth, where a user can create or modify contents displayed on a work space (such as a document, a spreadsheet, a slide of a presentation). In the creation or modification of such work spaces, a user may add various objects to the work space, such as tables of cells, graphics (pointers, arrows, lines, shapes), text boxes, images (e.g., pictures), and so forth.

In certain instances, the placement of the objects within the work space itself conveys information. For example, a pointer, line, or text box may be initially associated with a particular portion of another object, such as a cell of table, to draw attention to the respective cell or to provide information about the cell. However, modifications to certain such objects, such as a table to which a line or pointer is associated, may result in the desired placement relationship being inadvertently lost. It, therefore, may be a tedious operation for a user to monitor and make sure such relationships are maintained as a work space is modified or to actively move each affected object to maintain the desired placement relationships between objects.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The presently disclosed approaches relate to maintaining spatial relationships (i.e., a layout) between objects placed on a canvas of a new or existing application work space (e.g., a document, spreadsheet, or slide). For example, in instances where an object such as a table can be modified to add rows or columns, such modifications may be problematic for maintaining spatial relationships between other objects (e.g., pointers, lines, or text boxes) that are intended to refer to a particular cell of the table.

In an embodiment of the present approach, such relationships are maintained between objects by examining what objects are situated relative to the table in certain directions (such as beneath and to the right of the table), what the shapes of the objects are and whether there are associated points of interest to the objects, and what original offsets existed between the objects and the table object. This information may be used to maintain relationships (e.g., an offset) between other objects and the table object on the canvas in the event the table object is modified. In addition, the present approach may allow for dynamic adjustment of object positions in response to modifications to the table object so that a user can evaluate a modification before committing to the modification. Likewise, if multiple table objects are present and may impact the placement of other objects, the effects of the multiple tables are also taken into account when moving the other objects to maintain the desired placement relationships.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As noted above, certain types of applications (such as productivity applications running on processor-based system) may allow a user to generate or modify on an-screen work space (i.e., a virtual canvas) to create or modify content on the work space. Examples of such applications include word processing programs, spreadsheet programs, presentation programs, and so forth. In certain instances, the content added to the work space may be characterized as objects, where the objects may include various types of visual (or other) representations for conveying information. In certain such applications, one type of object that may be placed on the work space or canvas is a table object that consists of rows and columns of cells, each of which may contain textual or numeric information. Further, additional objects (such as pointers, lines, and text boxes) may be placed on the work space or canvas and may, indeed, be placed so as to specifically refer to a particular cell of the table object. As discussed herein, present embodiments may address various approaches by which the placement relationships between such objects and the table object may be properly maintained in the event the table object is modified, such as by adding rows or columns to the table object.

Figure 1:
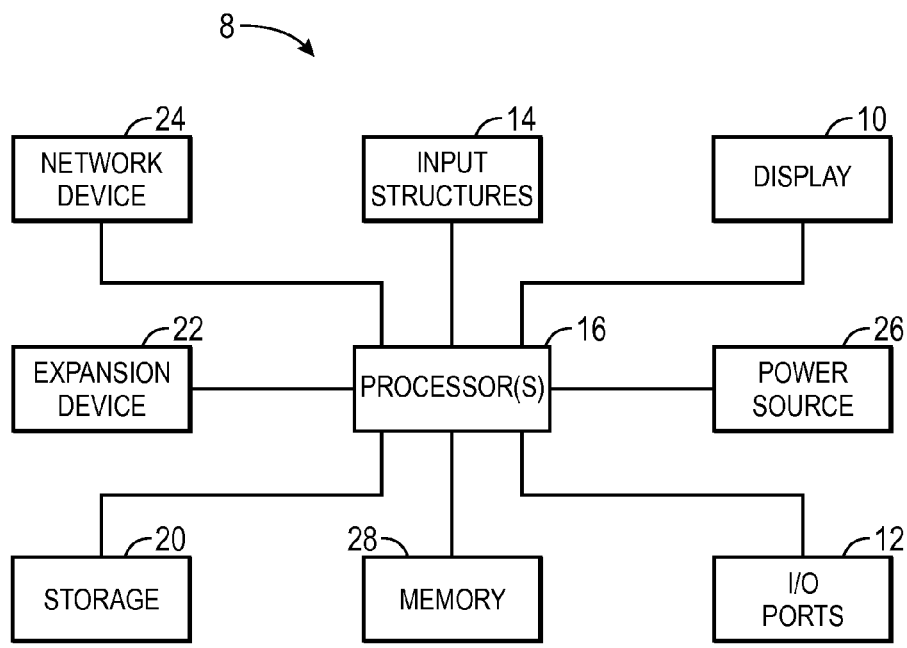
FIG. 1 is a block diagram of components of an example of an electronic device, in accordance with aspects of the present disclosure.
Figure 3:
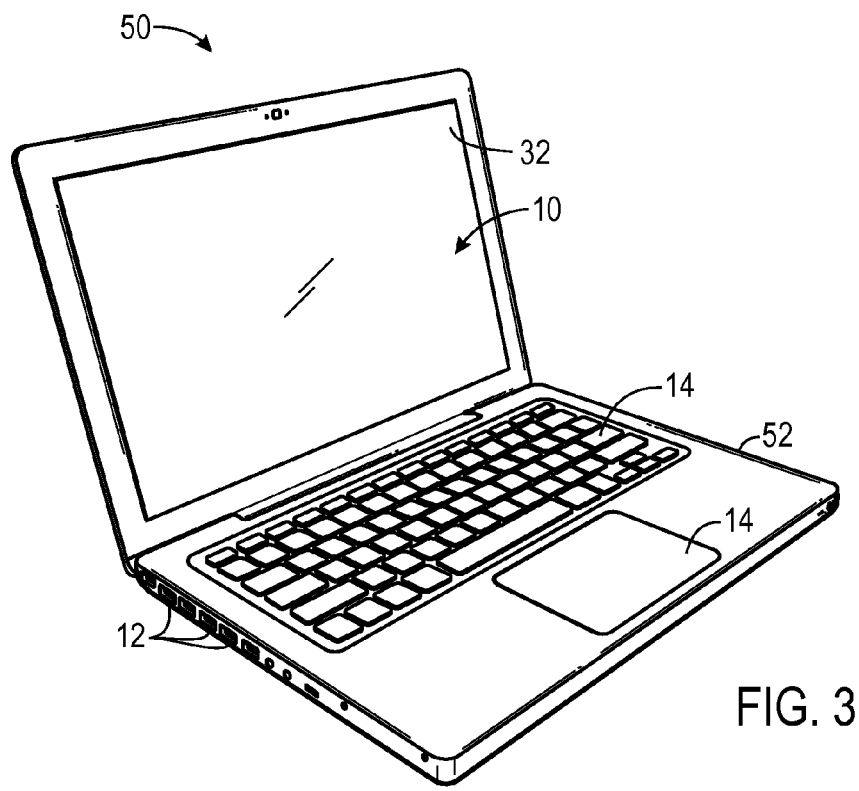
FIG. 3 is a perspective view of an example of a laptop electronic device, in accordance with aspects of the present disclosure.
Figure 2:
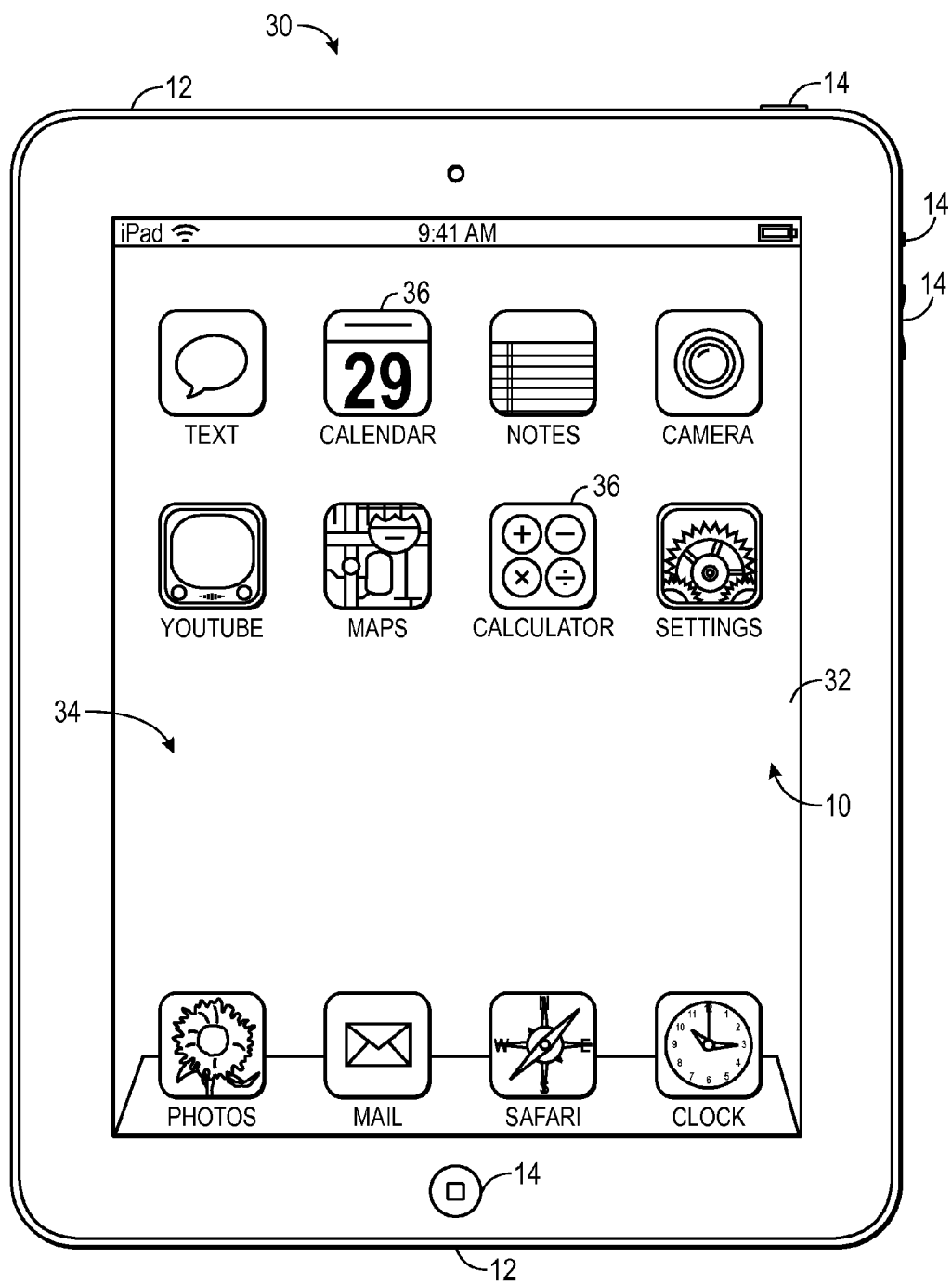
FIG. 2 is a perspective view of an example of a handheld electronic device, in accordance with aspects of the present disclosure.

With the foregoing in mind, a general description is provided below of suitable electronic devices that may be used in the implementation of the present approaches to object management. In particular, FIG. 1 is a block diagram depicting various components that may be present in an electronic device suitable for running an application that provides a user work space or canvas, as described herein, and allows a user to place, move, or modify objects on such a displayed work space or canvas. FIGS. 2 and 3 respectively illustrate perspective and front views of suitable electronic devices, which may be, as illustrated, a handheld electronic device (e.g., a tablet computer) or other mobile computing device (e.g., a laptop computer).

An example of an electronic device suitable for the techniques described herein may include various internal and/or external components. For example, FIG. 1 is a block diagram illustrating the components that may be present in such an electronic device 8, allowing the electronic device 8 to function. One of ordinary skill in the art will appreciate that the various functional blocks shown in FIG. 1 may comprise hardware elements (including circuitry), software elements (including computer code stored on a computer-readable medium), or a combination of both hardware and software elements. It should further be noted that FIG. 1 is merely one example of a particular implementation and is merely intended to illustrate the types of components that may be present in a device 8. For example, in the presently illustrated embodiment, these components may include a display 10, I/O ports 12, input structures 14, one or more processors 16, a memory device 18, a non-volatile storage 20, expansion card(s) 22, a networking device 24, and a power source 26.

With regard to each of these components, the display 10 may be used to display various images generated by the device 8. The display 10 may be an LCD, OLED-type display, or other suitable display device. Additionally, in certain embodiments of the electronic device 8, the display 10 may be provided in conjunction with a touch-sensitive element, such as a touchscreen, that may be used as part of the control interface for the device 8 and, further, may be used in conjunction with the presently disclosed approach to resize rows or columns of a table displayed on the touch-screen.

The I/O ports 12 may include ports configured to connect to a variety of external devices, such as a power source, headset or headphones, or other electronic devices (such as handheld devices and/or computers, printers, projectors, external displays, modems, docking stations, and so forth). The I/O ports 12 may support any interface type, such as a universal serial bus (USB) port, a video port, a serial connection port, an IEEE-1394 or Firewire™ port, a Thunderbolt™ port, an Ethernet or modem port, and/or an AC/DC power connection port.

The input structures 14 may include the various devices, circuitry, and pathways by which user input or feedback is provided to the processor 16. Such input structures 14 may be configured to control a function of the device 8, applications running on the device 8, and/or any interfaces or devices connected to or used by the electronic device 8. For example, the input structures 14 may allow a user to navigate a displayed user interface or application interface. Examples of the input structures 14 may include buttons, sliders, switches, control pads, keys, knobs, scroll wheels, keyboards, mice, touchpads, internal accelerometers, and so forth.

In certain embodiments, an input structure 14 and display 10 may be provided together, such as in the case of a touchscreen, where a touch sensitive mechanism is provided in conjunction with the display 10. In such embodiments, the user may select or interact with displayed interface elements (such as column or row elements of a displayed table) via the touch sensitive mechanism. In this way, the displayed interface may provide interactive functionality, allowing a user to navigate the displayed interface by touching the display 10.

User interaction with the input structures 14, such as to interact with a user or application interface displayed on the display 10, may generate electrical signals indicative of the user input. These input signals may be routed via suitable pathways, such as an input hub or bus, to the processor(s) 16 for further processing.

The processor(s) 16 may provide the processing capability to execute the operating system, programs, user and application interfaces (e.g., a word processor, spreadsheet, database, or presentation application user interface), and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more central processing units (CPUs), physics processors, graphics processors, video processors, audio processors and/or related chip sets.

The instructions or data to be processed by the processor(s) 16 may be stored in a computer-readable medium, such as a memory 18. Such a memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware for the electronic device 8 (such as a basic input/output instruction or operating system instructions), various programs, applications, or routines executed on the electronic device 8, user interface functions, processor functions, and so forth. In addition, the memory 18 may be used for buffering or caching during operation of the electronic device 8.

The components may further include other forms of computer-readable media, such as a non-volatile storage 20, for persistent storage of data and/or instructions. The non-volatile storage 20 may include flash memory, a hard drive, or any other optical, magnetic, and/or solid-state storage media. The non-volatile storage 20 may be used to store firmware, data files, software, hardware configuration information, and any other suitable data.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable connector, and may be accessed internally or external to the housing of the electronic device 8. For example, in one embodiment, the expansion card 22 may be a flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard; any 2G, 3G, or 4G cellular data standard; or any other suitable wireless networking standard. The network device 24 may allow the electronic device 8 to communicate over a network, such as a Local Area Network (LAN), Wide Area Network (WAN), or the Internet. Further, the electronic device 8 may connect to and send or receive data with any device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery or other type of suitable battery. The battery may be user-removable or may be secured within the housing of the electronic device 8 and may be rechargeable. Additionally, the power source 26 may include AC power, such as provided by an electrical outlet, and the electronic device 8 may be connected to the power source 26 via a power adapter and suitable connector port. This power adapter may also be used to recharge one or more batteries, if present.

With the foregoing in mind, FIG. 2 illustrates an electronic device 8 in the form of a handheld device 30, here a tablet computer. By way of example, the handheld device 30 may be a model of an iPad®, iPod®, or iPhone® available from Apple Inc. of Cupertino, Calif. It should be noted that while the depicted handheld device 30 is provided in the context of a tablet computer, other types of handheld devices (such as media players for playing music and/or video, personal data organizers, handheld game platforms, e-readers, handheld GPS navigation units, and/or combinations of such devices) may also be suitably provided as the electronic device 8. Further, a suitable handheld device 30 may incorporate the functionality of one or more types of devices, such as a media player, a cellular phone, a gaming platform, an e-reader, a personal data organizer, and so forth.

For example, in the depicted embodiment, the handheld device 30 is in the form of a tablet computer that may provide various functionalities (such as the ability to take pictures, record audio and/or video, listen to music, play games, map travel routes, and so forth) in addition to running applications, such as productivity software, capable of displaying and manipulating tables along with other displayed objects on a virtual canvas. As discussed with respect to the general electronic device of FIG. 1, the handheld device 30 may allow a user to connect to and communicate through the Internet or through other networks, such as local or wide area networks. The handheld electronic device 30, may also communicate with other devices using short-range connections, such as Bluetooth and near field communication.

In the depicted embodiment, the handheld device 30 includes an enclosure or body that protects the interior components from physical damage and shields them from electromagnetic interference. The enclosure may be formed from any suitable material such as plastic, metal, or a composite material and may allow certain frequencies of electromagnetic radiation to pass through to wireless communication circuitry within the handheld device 30 to facilitate wireless communication.

In the depicted embodiment, the enclosure includes user input structures 14 through which a user may interface with the device. Each user input structure 14 may be configured to help control a device function when actuated. For example, in a tablet computer implementation, one or more of the input structures 14 may be configured to invoke a "home" screen or menu to be displayed, to toggle between a sleep and a wake mode, adjust the volume of audible feedback, and so forth.

In the depicted embodiment, the handheld device 30 includes a display 10 in the form of an LCD 32. The LCD 32 may be used to display a graphical user interface (GUI) 34 that allows a user to interact with the handheld device 30. The GUI 34 may include various layers, windows, screens, templates, or other graphical elements that may be displayed in all, or a portion, of the LCD 32. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touchscreen included in the display 10, or may be selected by a user input structure 14, such as a mouse, wheel, or button.

The handheld electronic device 30 also may include various input and output (I/O) ports 12 that allow connection of the handheld device 30 to external devices. For example, one I/O port 12 may be a port that allows the transmission and reception of data or commands between the handheld electronic device 30 and another electronic device, such as a computer. Such an I/O port 12 may be a proprietary port from Apple Inc. or may be an open standard I/O port.

In addition to handheld devices 30, such as the depicted tablet computer of FIG. 2, an electronic device 8 may also take the form of a computer or other type of electronic device. Such computers may include computers that are generally portable (such as laptop or notebook computers) as well as computers that are generally used in one place (such as conventional desktop computers, workstations and/or servers). In certain embodiments, the electronic device 8 in the form of a computer may be a model of a MacBook®, MacBook® Pro, MacBook Air®, iMac®, Mac® mini, or Mac Pro® available from Apple Inc. By way of example, an electronic device 8 in the form of a laptop computer 50 is illustrated in FIG. 3, in accordance with one embodiment of the present disclosure. The depicted computer 50 includes a housing 52, a display 10 (such as the depicted LCD 32), input structures 14, and input/output ports 12.

In one embodiment, the input structures 14 (such as a keyboard and/or touchpad) may be used to interact with the computer 50, such as to start, control, or operate a GUI or applications running on the computer 50. For example, a keyboard, mouse, and/or touchpad may allow a user to navigate a user interface or application interface displayed on the LCD 32.

As depicted, the electronic device 8 in the form of computer 50 may also include various input and output ports 12 to allow connection of additional devices. For example, the computer 50 may include an I/O port 12, such as a USB port, Thunderbolt® port, or other port, suitable for connecting to another electronic device, a projector, a supplemental display, and so forth. In addition, the computer 50 may include network connectivity, memory, and storage capabilities, as described with respect to FIG. 1. As a result, the computer 50 may store and execute a GUI and other applications (e.g., productivity and/or presentation applications having a user interface).

With the foregoing discussion in mind, an electronic device 8, such as either a handheld electronic device 30 or computer 50, may be used to store and run an application that allows a user to position objects, including table objects, on a work space (i.e., virtual canvas) of a suitable application. Such tables typically include multiple rows and columns that define individual cells where data is entered and may be modified. The present disclosure relates to approaches and algorithms whereby positional relationships between other objects and a table object are maintained when the table object is modified. Examples of such modification can include, but are not limited to, resizing a row or column, deleting a row or column, adding a row or column, editing the contents of a cell of the table, applying a style to a cell of the table, applying a wrap effect to one or more cells of the table containing text, and so forth.

In response to such changes to the table object, it may be desirable to reposition other objects (i.e., other tables, charts, text boxes, graphics and shapes) such that the other objects remain in a similar position relative to the table object (i.e., maintain the initial layout). As discussed herein, in accordance with certain implementations, maintaining these spatial relationship between objects may involve automatically determining factors such as: which shapes are below and to the right of the table (additions of rows and columns of a table and resizing rows and columns typically result in the lower or rightmost edges of a table being moved, not the upper or leftmost edges); which objects intersect the table; and where are the points of interest (e.g., pointers) on affected objects.

In addition, in certain implementations initial offsets of such points of interest with positions in the table may be stored and used to return the table and objects to an initial state in the event that a user makes a dynamic movement and returns the table to its original configuration in the same movement, thereby allowing a user to review the effects of a modification to the table without committing to the modification. For example, to the extent that multiple objects may be displaced in response to a change to a table object, all of the displacements may be treated or viewed as a single occurrence, and may all be accepted, undone, or modified together. In this manner, the present approaches allow a user to dynamically modify, undo or reverse the effects a resize operation applied to a table object has on other objects.

Figure 4:
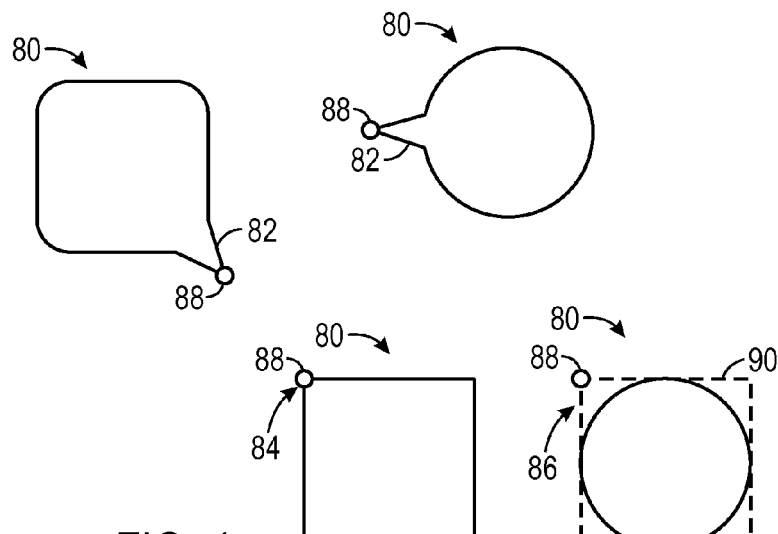
FIG. 4 depicts samples of graphical objects with associated points of interest which may be displayed in an application work space, in accordance with aspects of the present disclosure.

With the foregoing in mind, and to provide context for the following discussion, FIG. 4 depicts a sample of graphical objects 80 that may be placed or moved on a work space (i.e., a virtual canvas) of an application implemented on an electronic device 8, such as a spreadsheet application. In the depicted examples, the graphical objects 80 take the form of various shapes that may be displayed in an application work space as call-outs, text boxes, or pointers and which may be associated with some portion of another object (such as a cell of a table object also displayed in the work space) to convey information about or draw attention to that portion of the other object.

In these example, certain of the graphical objects 80 may include a pointer region 82, a corner 84, or an associated proximity region 86 that is employed in associating the respective graphical object 80 with the portion of the other object, such as to point to a cell of a table object. For example, for those graphical objects that include a pointer region 82, the pointer region 82 may be positioned or situated so as to clearly point to or reference a particular portion of another object. For those graphical objects that do not include a pointer region, the proximity of the graphical object itself to a region of the other object may be sufficient to form the desired association between the graphical object and a portion of the other object.

In the present context, each shape or graphical object may have at least one tracking point (i.e., a point of interest) 88 designated for that object and used in maintaining the relative position of the respective graphical object 80 with respect to another object, such as a table object, on the application work space. In FIG. 4, each tracking point 88 is depicted by a circular region, though it should be appreciated that this depiction is only for illustration of the tracking point concept, and circular indicators would not actually be visible when the graphical objects 80 are displayed in real world use.

By way of illustration, the graphical object examples of FIG. 4 having a pointer region 82 typically have a portion of the pointer region 82, such as the tip of the pointer region, designated as the tracking point 88. For graphical objects that do not include pointer regions but which do include one or more corners 84, one of the corners 84, such as the upper left corner, may be designated as the tracking point 88. For graphical objects that do not include a pointer region 82 or a corner 84, the tracking point 88 may be designated on the edge of the graphical object or at a point 88 proximate to the graphical object, such as might be established based on an imaginary boundary 90 our outline defining a space envelope for the respective graphical object.

Figure 5:
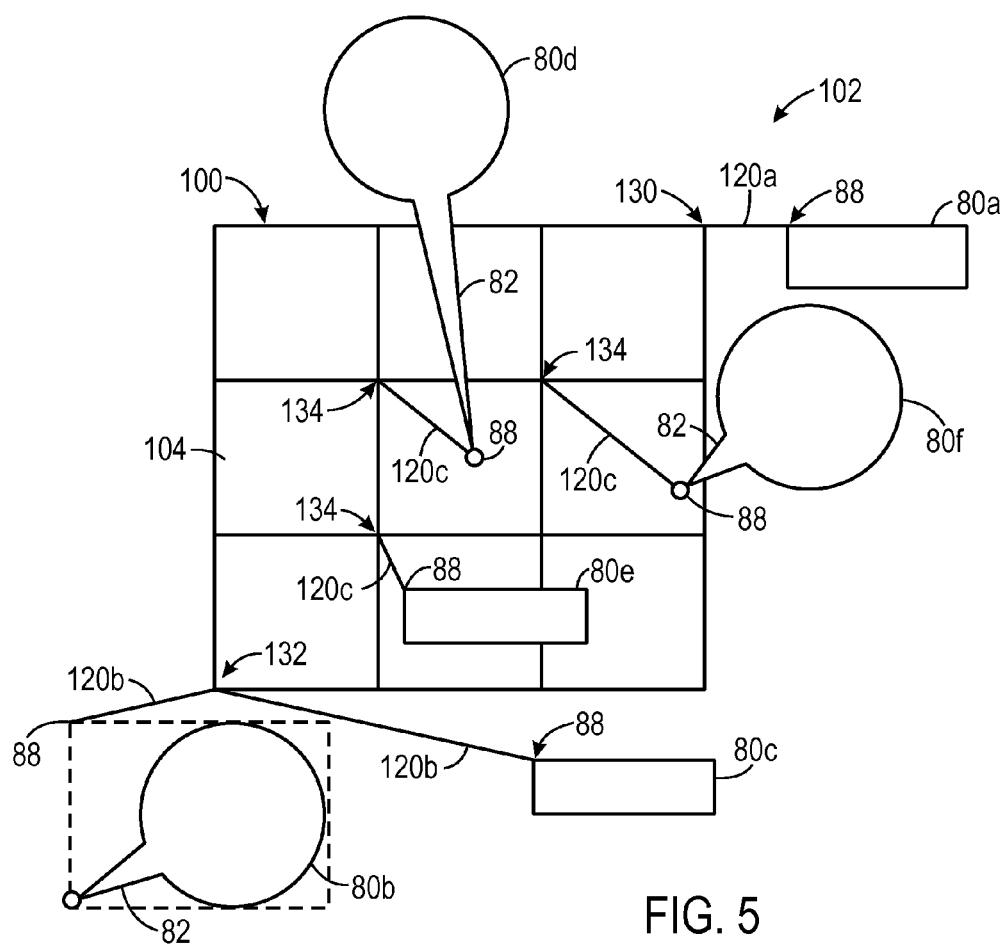
FIG. 5 depicts an application work space on which a table object and multiple other objects are positioned, in accordance with aspects of the present disclosure.

With the forgoing comments in mind, FIG. 5 depicts the display of such graphical objects 80 in conjunction with a table object 100. In this example, the table object 100 and graphical objects 80 are displayed on a work space 102 of a spreadsheet application, though the present approaches may also apply to other productivity applications. Notably, in this example the underlying work space 102 provided by the spreadsheet application is blank (i.e., does not include a grid of spreadsheet cells or other application specific features or markings), with spreadsheet functionality instead provided by one or more discrete table objects 100 that can be placed on and manipulated on the work space 102.

To facilitate explanation, several of the illustrated graphical objects 80 of FIG. 5 include a pointer region 82 with an associated tracking point 88 at the tip of the respective pointer region 82. Other depicted graphical objects 80 are rectangular in shape, with the upper, left corner 84 designated as the tracking point 88. In this example, several of the pointer regions 82 of respective graphical objects 80 point to particular cells 104 of the table object 100. As will be appreciated, such graphical objects 80 may include text boxes or other call-out features that reference the cell 104 being pointed to, proximate to, or overlaid by the respective graphical object 80, providing a viewer with additional information about a respective cell 104 or drawing the viewer's attention to cells 104 deemed important.

As will be appreciated in the depicted example, to the extent that the graphical objects 80 are separate and independent objects relative to the table object 100, changes made to table object 100 (such as adding or deleting a row or column or resizing a row or column) may result in a graphical object 80 that references a specific portion (e.g., cell) of the table object 100 to no longer properly reference the intended part of the table object 100. In accordance with certain implementations, an algorithm may be employed to help automatically maintain the relative positions (i.e., layout) of the graphical objects 80 with respect to the table object 100.

Figure 6:
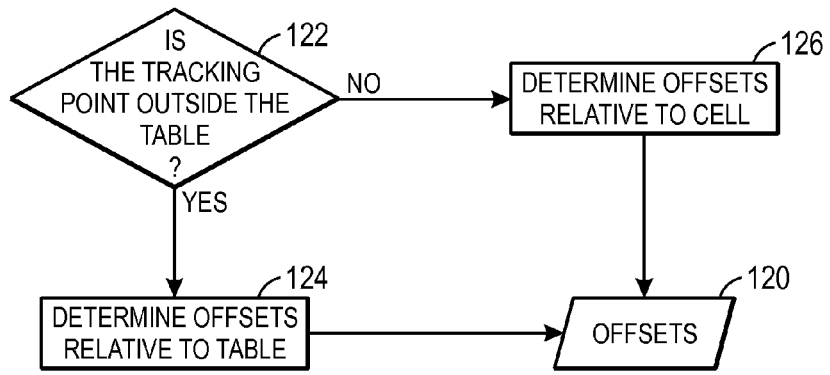
FIG. 6 depicts a process flow diagram for determining offsets for objects displayed on an application work space, in accordance with aspects of the present disclosure.

As depicted in the flow diagram of FIG. 6, in accordance with one approach, one such algorithm may initially determine offsets 120 based on the location of the tracking points 88 associated with each object 80 relative to the table object 100 or cells 104 of the table object 100. In the depicted example of an algorithm process flow, an initial determination (block 122) is made as to whether a tracking point 88 for a respective object 80 is outside the bounds of the table object 100 (i.e., the tracking point 88 is not on or inside of the table object 100 or does not otherwise intersect the table object 100).

If the tracking point 88 for an object 80 is determined to be outside the table object 100, an offset 120 is determined (block 124) for the respective object 80 that is the measured between a designated point on the table object 100 and the respective tracking point 88 of the object 80. By way of example, returning to FIG. 5, objects 80 determined to have a tracking point 88 outside the table object 100 (i.e., objects 80*a*, 80*b*, and 80*c*) have offsets 120 determined from their respective tracking points 88 to one or more designated points on the table object 100. In the illustrated example, objects 80*a* with tracking points 88 determined to be to the right of the table object 100 have an offset determined between the respective tracking point 88 and the upper right corner 130 of the table object 100 (i.e., offset 120*a*). Conversely, objects 80 (e.g., objects 80*b* and 80*c*) with tracking points 88 determined to be below the table object 100 have an offset determined between the respective tracking point 88 and the lower left corner 132 of the table object 100 (i.e., offset 120*b*). For objects 80 determined to be to the left of or above the table object 100, no offset 120 will generally be needed as changes to the table object 100 (as in adding or deleting row or columns or resizing rows or columns) typically result in the lower and rightmost boundaries of the table being moved.

Turning back to FIG. 6, if the tracking point 88 for an object 80 is determined to not be outside the bounds of the table object 100 (i.e., is inside or on the table object 100), an offset 120 is determined (block 126) for the respective object 80 that is the measured between a designated point on the referenced cell 104 (i.e., the cell in which the tracking point 88 is located) and the respective tracking point 88. By way of example, returning to FIG. 5, objects 80 determined to have a tracking point 88 within cells 104 of table object 100 (i.e., objects 80*d*, 80*e*, and 80*f*) have offsets determined from their respective tracking points 88 to a designated point of the referenced cells 104 (i.e., offset 120*c*). In the illustrated example, objects 80*d*, 80*e*, and 80*f* each have a respective offset 120*c* measured between the respective tracking points 88 and the upper left corner 134 of the respective referenced cells 104.

Figure 7:
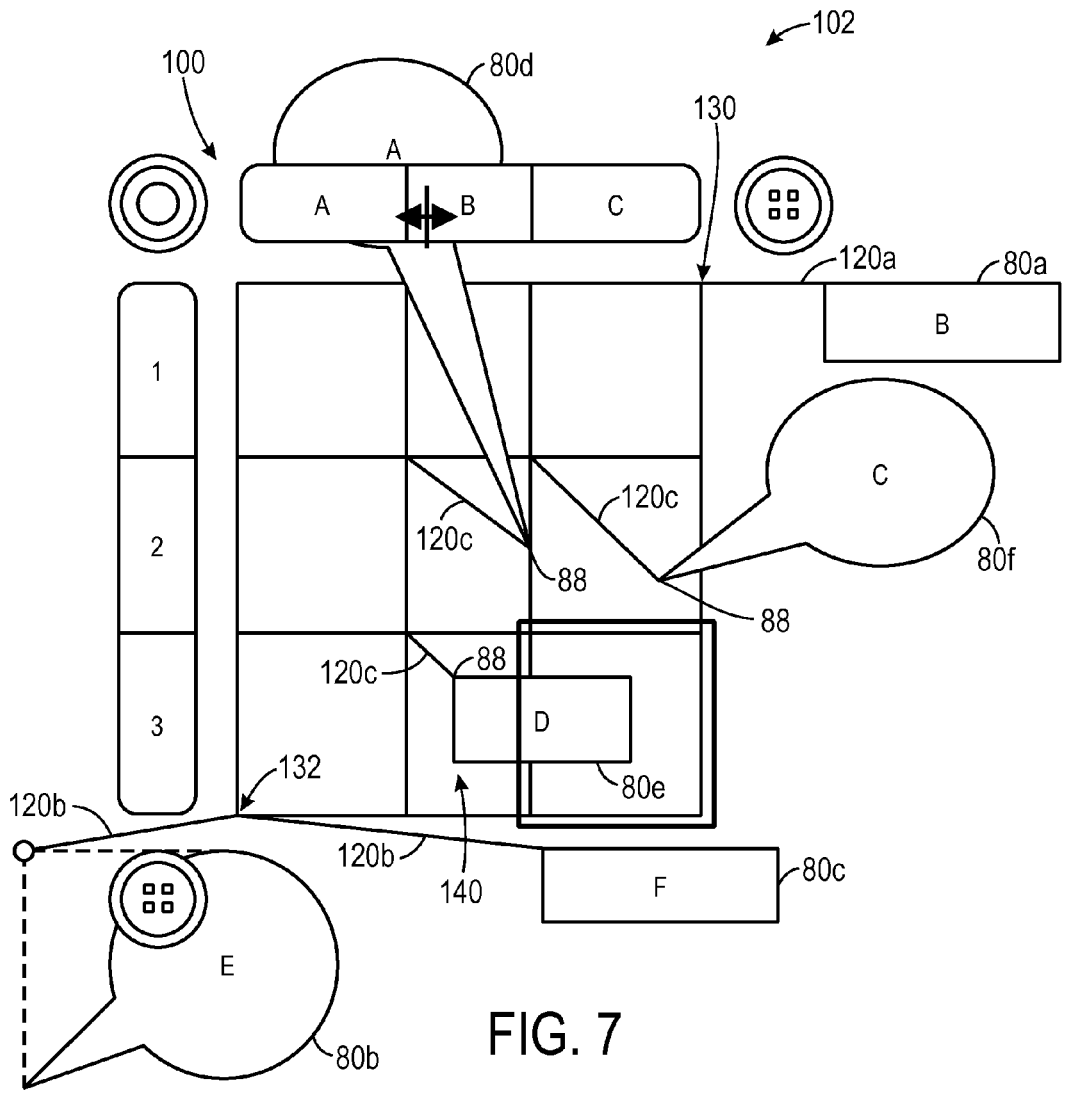
FIG. 7 depicts the table object and other objects of FIG. 5 after a column of the table object is narrowed, in accordance with aspects of the present disclosure.

Once the offsets 120 are known and stored, the offsets 120 may be used, upon modification of the table object 100, to maintain (when possible) the relative positions of the graphical objects 100 to the table object 100 or to the referenced cells 104, depending on where the respective tracking point 88 of an object 80 was determined to reside. By way of example, turning to FIG. 7, the arrangement of the table object 100 and graphical objects 80 depicted in FIG. 5 is shown, but with a reduction in the width of the second column 140 of cells 104. In this example, the respective offsets 120 initially determined for each object 80 are maintained with respect to the respective reference point (i.e., upper right corner 130 of the table object 100 for offset 120*a*, lower left corner 132 of the table object 100 for offsets 120*b*, and upper left corner 134 of the referenced cell 104 for offsets 120*c*) for an object 80.

Figure 8:
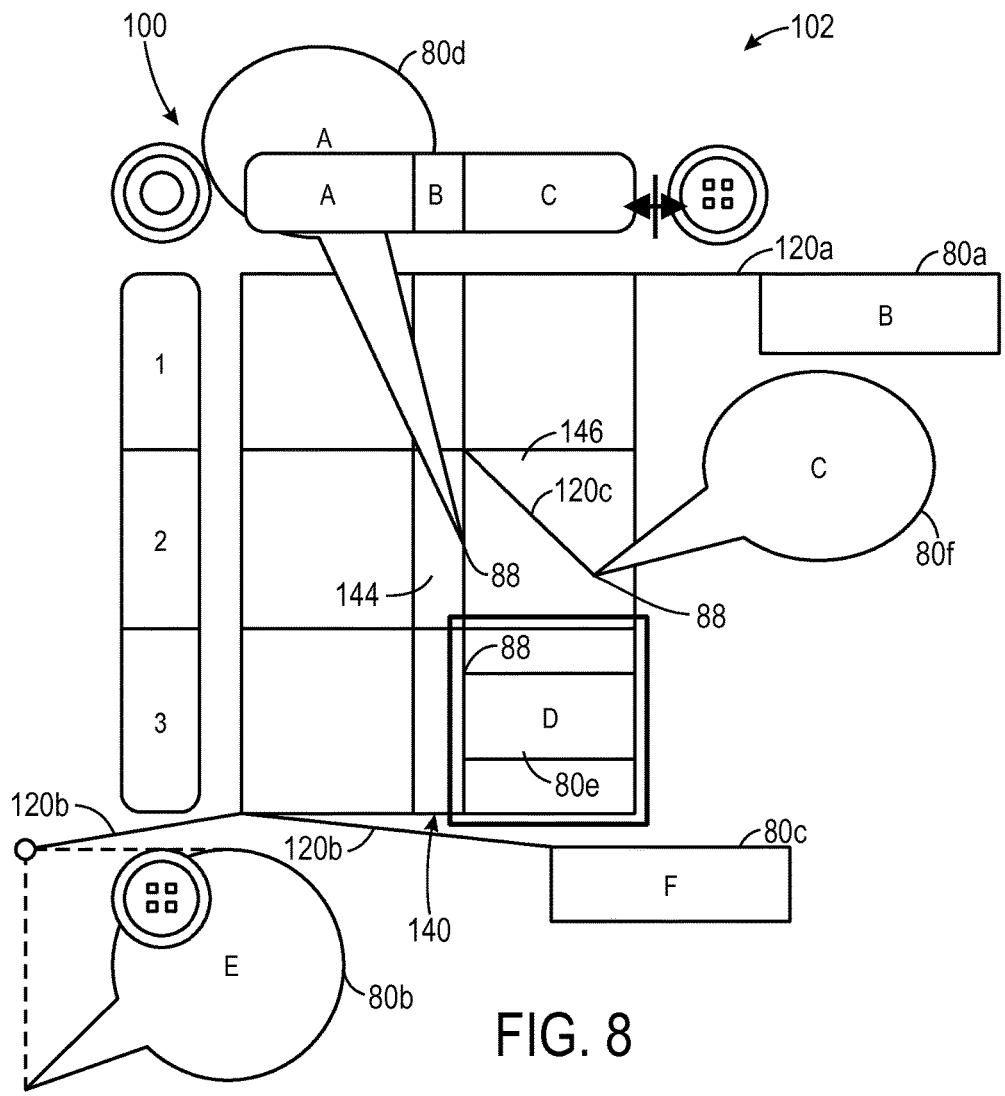
FIG. 8 depicts the table object and other objects of FIG. 5 after a column of the table object further narrowed, in accordance with aspects of the present disclosure.

In FIG. 8, an example is depicted of one approach that may be taken when a column or row resize event occurs that prevents an offset 120 from being maintained with respect to an object 80. In this example, object 80*d* has a tracking point 88 that is initially at an offset 120*c* (i.e., an offset between the tracking point 88 and the upper left corner of the referenced cell 144). The respective offset 120*c* in turn has a vertical (i.e., height) and horizontal (i.e., width) component describing the desired vertical and horizontal displacement of the respective tracking point 88 and the upper left corner of the referenced cell 144. As the column 140 containing the referenced cell 144 decreases in width, however, the referenced cell 144 may no longer be sufficiently wide to allow for the desired horizontal displacement associated with the respective offset 120*c*. Object 80*e* is similarly, though less dramatically, affected by column 140 being resized to be too narrow to accommodate the horizontal displacement associated with the respective offset 120*c* corresponding to object 80*e*.

In the depicted example, this circumstance may be addressed by maintaining the vertical displacement associated with the respective offset 120*c*, and associating the tracking point 88 of the affected object with the right border of the referenced cell 144 in instances where the referenced cell has been changed in size such that horizontal displacement of the respective offset 120*c* cannot be accommodated. As will be appreciated other approaches may also be employed to address such a circumstance, including moving the affected tracking point 88 (and the attached object 80*d*) to a corner (e.g., the upper left corner) of the referenced cell 144 or associating the respective tracking point 88 with another specified portion of the referenced cell 144 (e.g., another border of the cell).

It should be further noted in this example that objects 80*b* and 80*c*, which are below the table object 100 and not associated with any particular cell (as their respective offsets 120*b* are associated with the lower left corner of the table object 100 itself) are not moved in response to the change in width of the selected column 140. Conversely, object 80*a* (with an offset 120 associated with the upper right corner of the table object 100) and object 80*f* (with an offset 120*c* associated with a different referenced cell 146 that is unchanged in size) are moved to the left on the work space 102 in the same amount that column 140 is narrowed, thereby maintaining their respective offsets 120*a* and 120*c* between their respective tracking points 88 and reference points (i.e., upper right corner of table object 100 and upper left corner of referenced cell 146, respectively).

Figure 9:
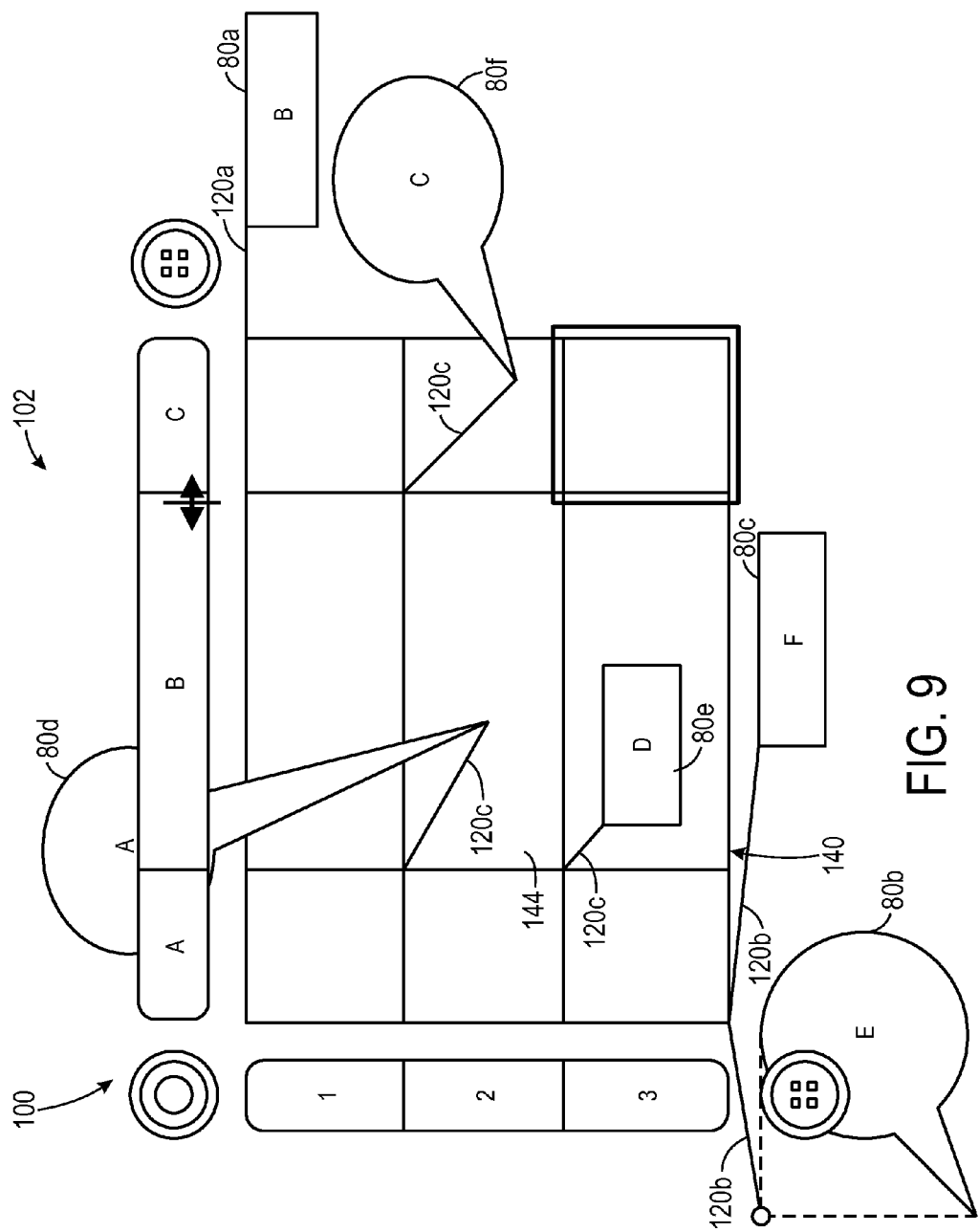
FIG. 9 depicts the table object and other objects of FIG. 5 after a column of the table object is widened, in accordance with aspects of the present disclosure.

Turning to FIG. 9, the example has been revised to illustrate the selected column 140 being widened as opposed to narrowed. In this example, the respective offsets 120*c* associated with objects 80*b* and 80*e* have sufficient horizontal spacing to be maintained at their original position with respect to their respective reference points (i.e., the upper left corners of their respective referenced cells). As in the instance where the column 140 was narrowed, the objects 80*b* and 80*c* beneath the table object 100 are unaffected due to their lack of association with any particular cell, including the widened cells. Instead, their respective offsets 120*b* are associated with the lower left corner of the table object 100, which is unaffected by the change in width of column 140. Conversely, objects 80*a* and 80*f* are moved to the right on the work space 102 in the same amount that column 140 is widened, thereby maintaining their respective offsets 120*a* and 120*c* between their respective tracking points 88 and reference points (i.e., upper right corner of table object 100 and upper left corner of referenced cell 146, respectively).

Figure 10:
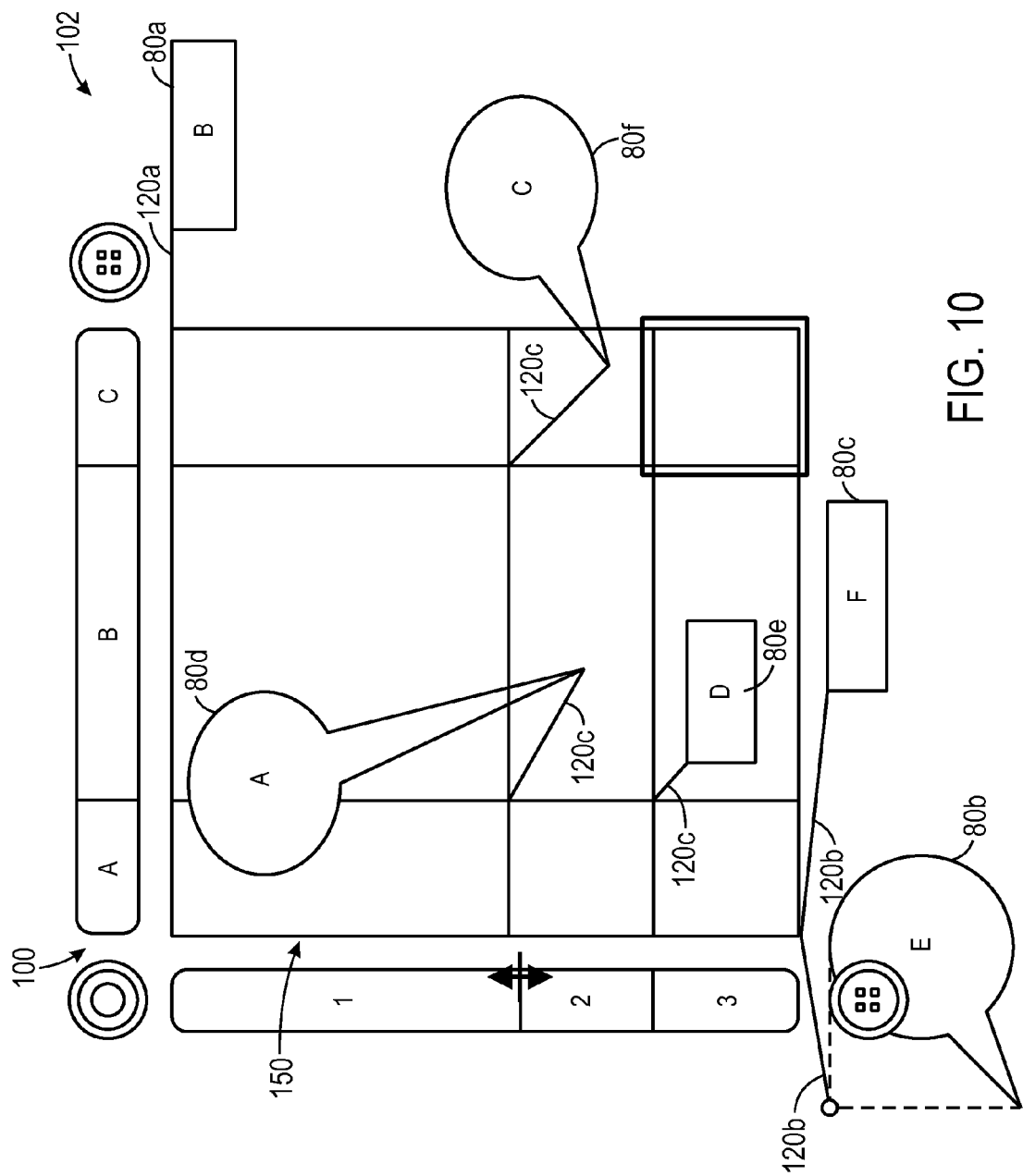
FIG. 10 depicts the table object and other objects of FIG. 5 after a row of the table object is widened, in accordance with aspects of the present disclosure.

As will be appreciated, the above examples apply in an analogous manner to changes in height associated with a row of cells (or insertion or deletion of a row of cells) of the table object 100. For example, turning to FIG. 10, a row 150 of cells 104 is widened with respect to the original layout.

In this example, the object 80*a* to the right of the table object 100 is unaffected due to its lack of association with any particular cell, including the narrowed cells within row 150. Instead, object 80*a* has an offset from its respective tracking point to the upper right corner of the table object 100, which is unmoved by the increase in the height of row 150. Likewise, the respective increase in height of row 150 does not change the dimensions of any cell 104 referred to by an object 80 (i.e., no object tracking points 88 refer to or are within the cells where height is increased). The change in height of row 150, however, does, push the rows beneath the affected row 150 downward, causing all of objects 80*b*, 80*c*, 80*d*, 80*e*, and 80*f*, to be moved downward to the extent row 150 was increased in height, though all of the moved objects maintain their initial offset distance 120 from their respective reference points.

The preceding covers various approaches by which separate and discrete graphical objects 80 may be maintained, when possible, at respective fixed positions relative to a table object 100 or to cells within the table object 100. As discussed above, when a table object 100 is modified so that it shrinks or grows in the vertical dimension, objects 80 that intersect (i.e., overlay) the table object 100 and objects 80 that are below the table object 100 may be moved so as to maintain their relative positioning with respect to the table object 100 (such as based on their predetermined offsets 120). However, it should also be appreciated that objects 80 that are below the moved objects may also be moved. Similarly, when a table object 100 is modified so that it shrinks or grows in the horizontal dimension, objects 80 that are above (i.e., overlay) the table object 100 and objects 80 that are to the right of the table object 100 may be moved so as to maintain their relative positioning with respect to the table object 100 (such as based on their predetermined offsets 120). As in the vertical instance, it should also be appreciated that objects 80 that are to the right of the moved objects may also be moved.

Figure 11:
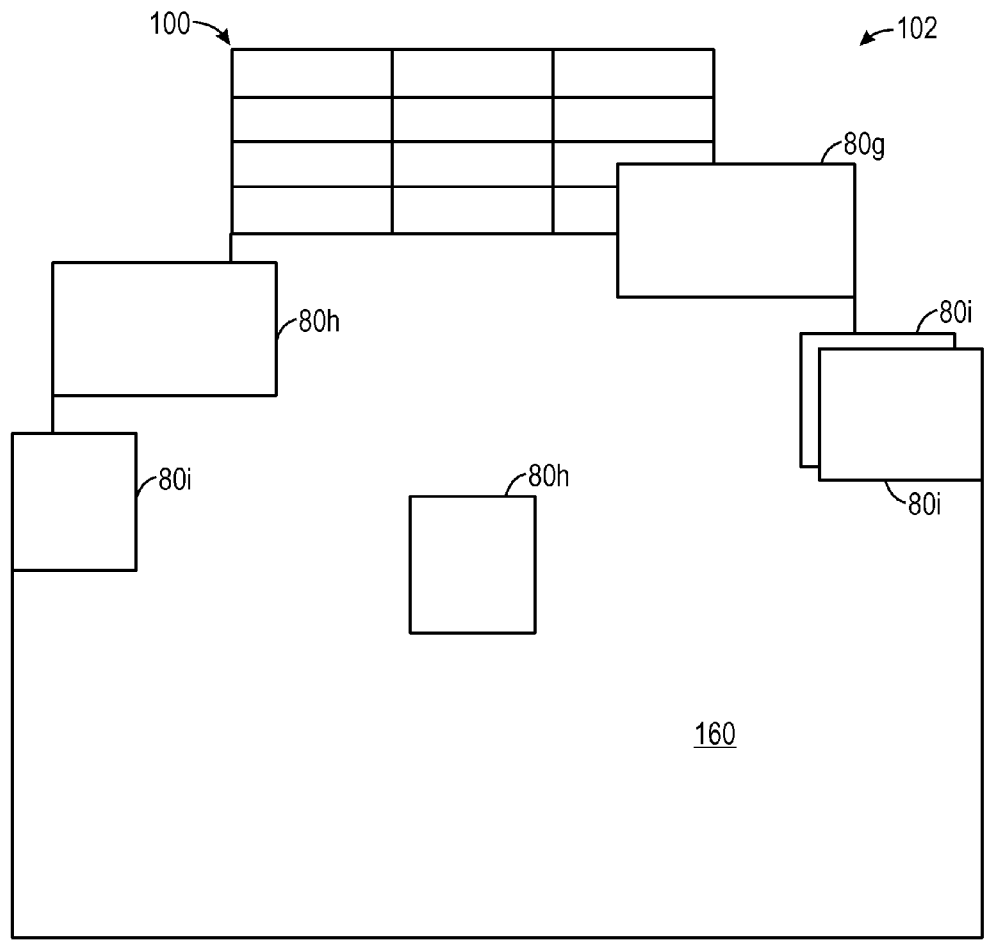
FIG. 11 depicts an application work space on which a table object and multiple other objects are positioned and depicting a region of influence where changes to the table object affect other objects, in accordance with aspects of the present disclosure.

Turning to FIG. 11, an example of a vertical realignment operation is provided for further explanation. In this example, each of the objects 80 shown are subject to being vertically displaced when a change is made to the height of the table object 100. That is, objects 80*g* that are touching or overlie the table object 100 are subject to displacement in response to a change in the table object 100 in the vertical dimension. In addition, objects 80*h* that are immediately or partly beneath the table object 100 are also subject to displacement vertically when the table object 100 is resized in the vertical dimension. Further, there are also objects 80*i* that are not touching or beneath the table object 100 that are still subject to displacement. In particular, the objects 80*i* are completely or partly beneath other intermediary or intervening objects (i.e., objects 80*g* and 80*h*) that are subject to displacement when the table object 100 is changed. To facilitate explanation of this concept, shaded area 160 is depicted showing the cascading effect that can lead to objects 80*i* not directly beneath the table object 100 being subject to displacement due to the effects of other, intermediary, objects 80*g* and 80*h*. In this manner, the positional relationship of objects 80 not only to the table object 100 but also between one another may be maintained. As will be appreciated, though the present example pertains to a vertical context, the horizontal context is similar and can result in objects 80 not directly to the right of the table object 100 being subject to displacement when the table object 100 is resized in the horizontal dimension.

Figure 12:
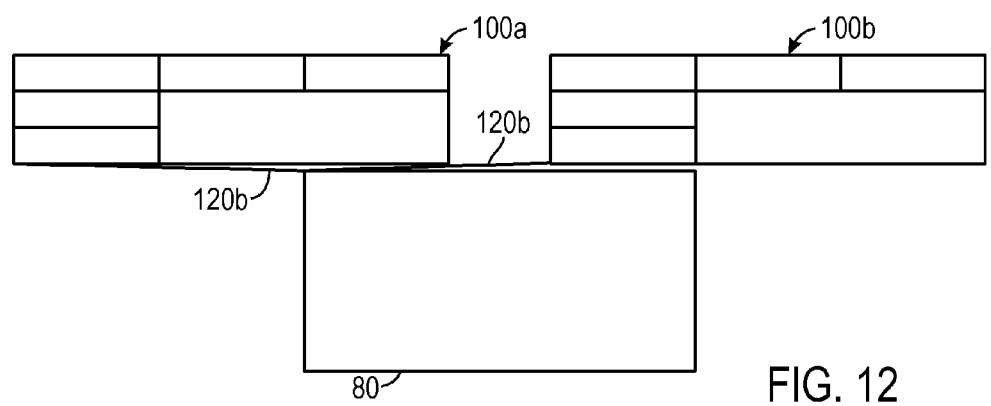
FIG. 12 depicts an application work space on which two side-by-side table objects and another object are positioned, in accordance with aspects of the present disclosure.

In addition, it should be noted that, while the preceding examples address situations where a single table object 100 is present, in other examples more than one table object 100 may be present that can influence the displacement of nearby objects 80. For example, turning to FIG. 12, two table objects 100 are depicted as being present on the application work space 100. In addition, a graphical object 80 is depicted as being partly beneath both table objects 100. As will be appreciated, it may be useful to address the manner in which the object 80 is displaced in response to changes made on one of the tables 100 or made on both of the tables 100.

Figure 13:
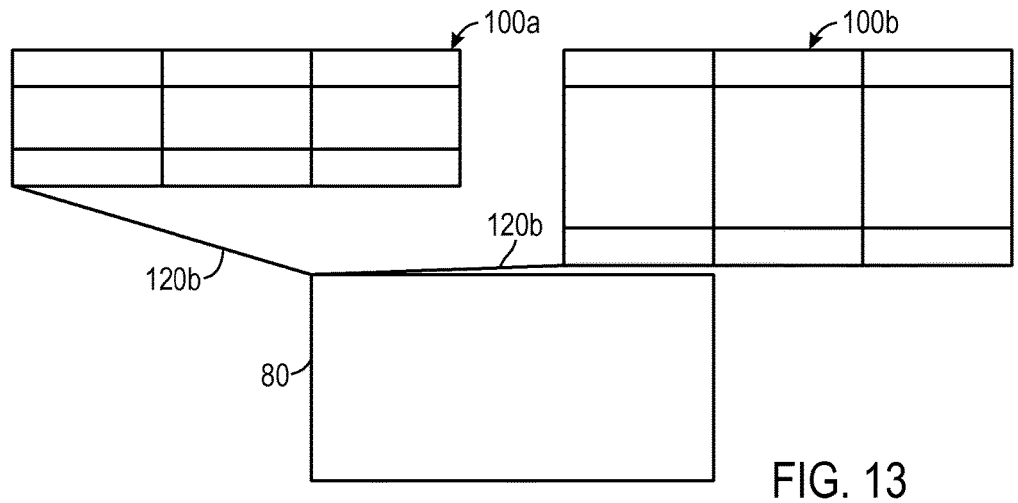
FIG. 13 depicts the table objects and other object of FIG. 12 after respective rows of each table object widened, in accordance with aspects of the present disclosure.

For example, assume both table object 100*a* and table object 100*b* are modified so that the respective heights of each table object 100 are changed by different amounts (or if the height of only one of the table objects 100 is changed). In one implementation, the object 80 is displaced only in response to the larger of the two offset changes, as depicted in FIG. 13. That is, in such an example, the smaller offset change is subsumed or otherwise included within the larger offset change. Thus, only one offset change is applied (the larger change), which also accommodates the displacement, if any, that would otherwise have been needed to accommodate any vertical size change to the other table object.

Figure 14:
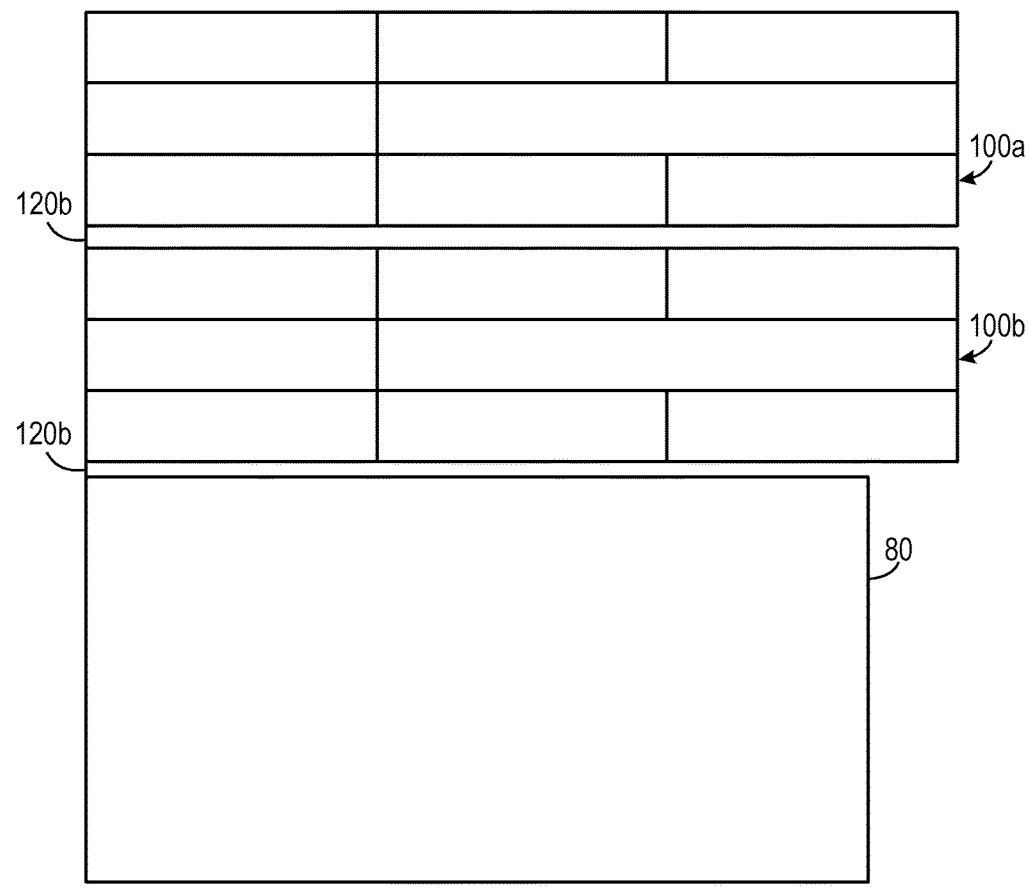
FIG. 14 depicts an application work space on which two stacked table objects and another object are positioned, in accordance with aspects of the present disclosure.

Alternatively, in some circumstances multiple table objects 100 may be present and one or more of the table objects 100 may act to displace another table object 100 when modified. For example, FIG. 14 depicts a table object 100b that is below another table object 100a and above a graphical object 80. In this circumstance, the topmost table object 100a if modified in the vertical dimension, would displace all objects below, including the lower table object 100b (i.e., the table object 100b would be displaced in the same manner as objects 80 noted above) as well as object 80. The additional complexity in the circumstance depicted in FIG. 14 is that the table object 100b may also be resized or modified in the vertical dimension.

Figure 15:
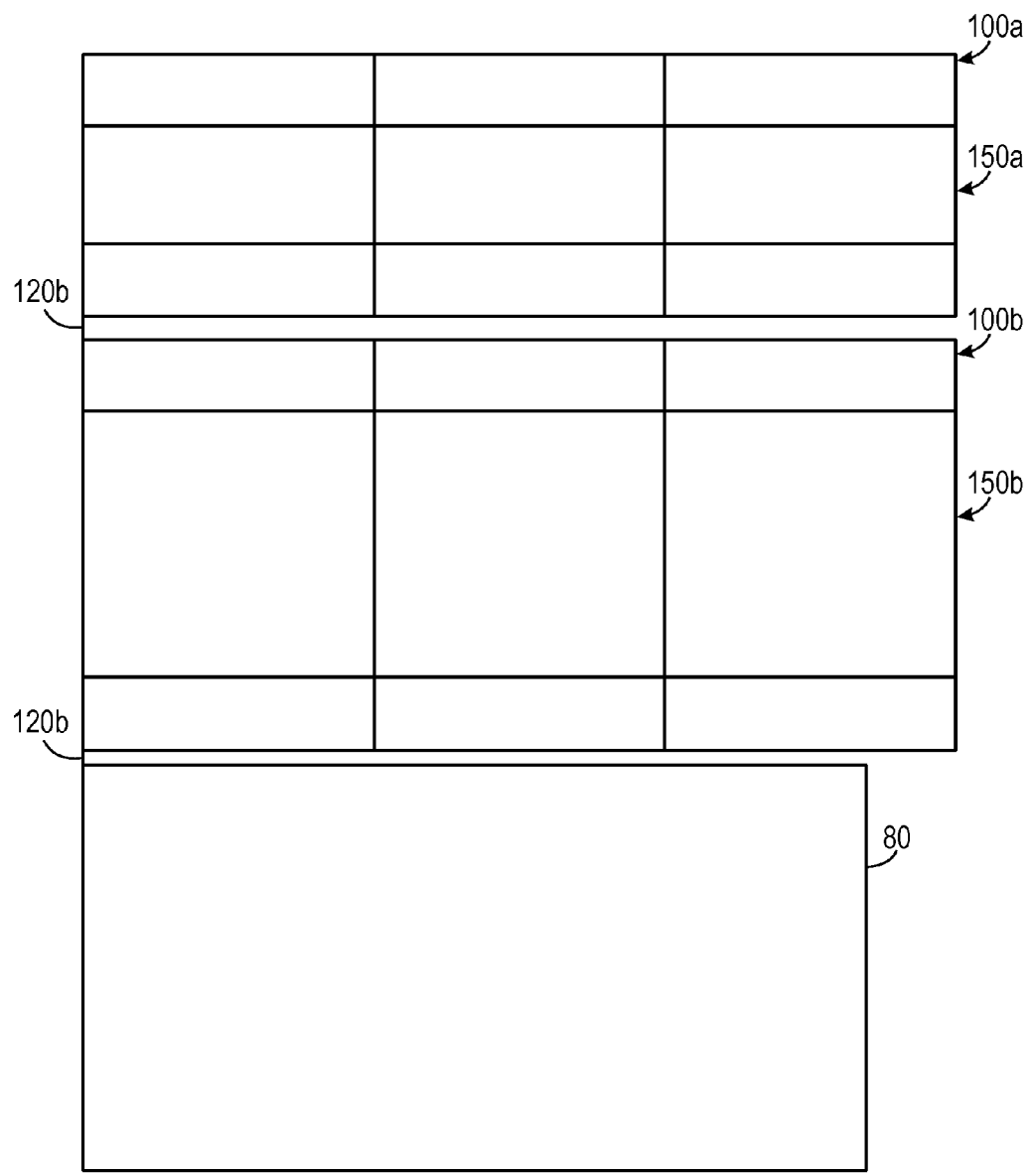
FIG. 15 depicts the table objects and other object of FIG. 14 after respective rows of each table object widened, in accordance with aspects of the present disclosure.

For example, turning to FIG. 15, a selected row 150a of table object 100a is increased in height (i.e., in the vertical dimension) (relative to the height depicted in FIG. 14). As a result, table 100b is moved lower to maintain the offset 120b between the table object 100a and table object 100b (i.e., the offset determined between the upper left corner of table object 100b and the lower left corner of table object 100a). In this example, subsequent to or simultaneous with the change in height of row 150a of table object 100a, a selected row 150b of table object 100b is also increase in the vertical dimension (i.e., widened). As a result, the object 80 beneath table object 100b is moved downward to maintain the offset 120b between the object 80 and table object 100b (i.e., the offset determined between the upper left corner of object 80 and the lower left corner of table object 100b). Due to maintaining both the offsets between the table object 100a and 100b and between the object 80 and table object 100b, the object 80 is effectively pushed downward by the change in height applied to both the rows 150 in each respective table object 100a and 100b.

Figure 16:
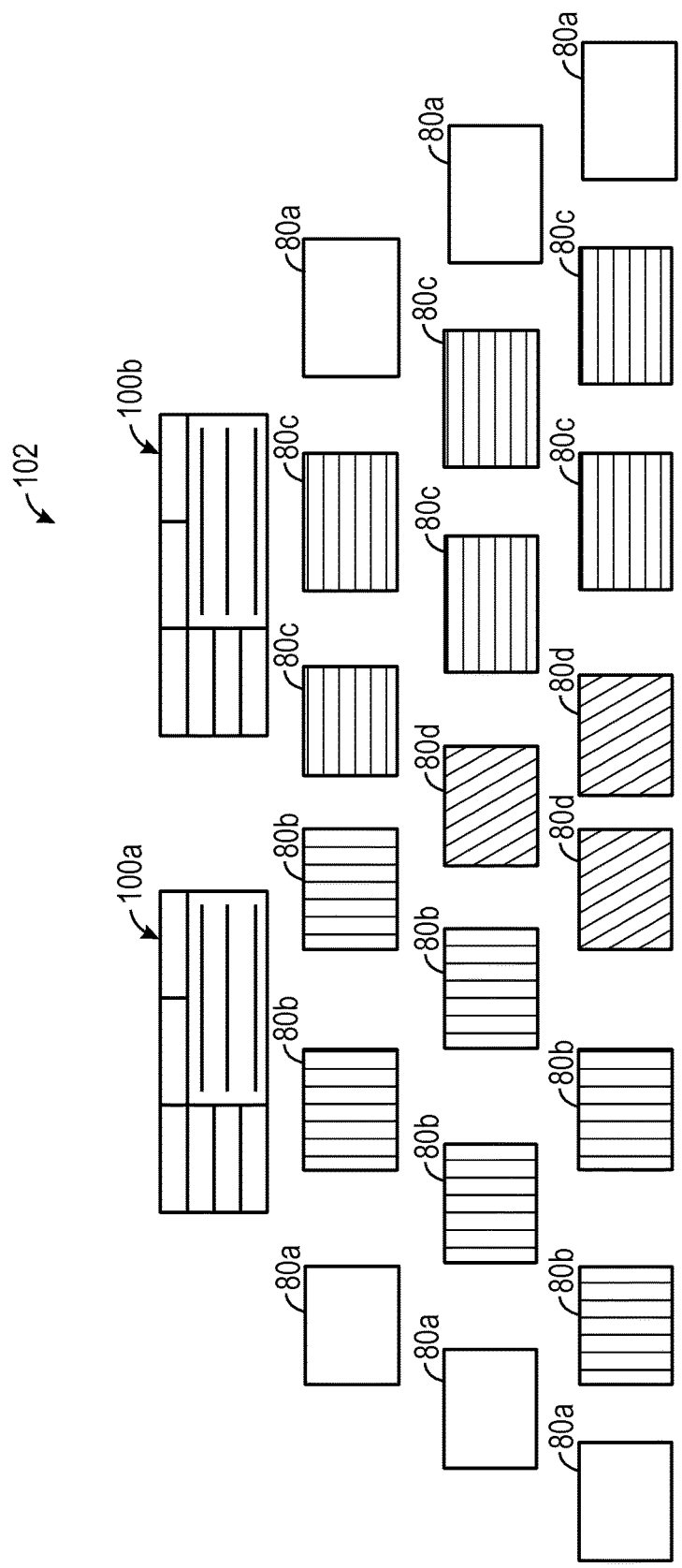
FIG. 16 depicts an application work space on which two side-by-side table objects are situated along with a plurality of other objects, where the region of influence of each table object on underlying objects is depicted, in accordance with aspects of the present disclosure.

With the foregoing discussion in mind, FIG. 16 illustrates the cascading effects that may be present when multiple objects 80 and table objects are present in an application work space 102, such as a virtual canvas associated with a spreadsheet application. In this example, two table objects 100a, 100b are depicted, both of which contain elements (i.e., row and columns of table cells) that can be resized in one or both of the horizontal or vertical dimension. To facilitate explanation, the present discussion focuses on vertical resize events, though it should be appreciated that the present discussion is equally applicable to resize events occurring in the horizontal dimension.

In this example, numerous objects 80 are positioned beneath the table objects 100a, 100b in the vertical dimension. With the foregoing discussion in mind, objects 80a are not beneath either table objects 100a or 100b and are not beneath any other object that is directly or indirectly beneath table objects 100a or 100b. Therefore, objects 80a are unaffected by (and are not moved in response to) changes to the height of the respective table objects 100a and 100b, such as due to resizing of rows within these table objects.

Conversely, objects 80b are each either directly beneath table 100a or are otherwise beneath another object 80b that is displaced by changes in the height of table object 100a. Thus each of objects 80b would be displaced vertically (e.g., downward) by an amount equal to a change in the height of table objects 100a. Similarly, objects 80c are each either directly beneath table 100b or are otherwise beneath another object 80c that is displaced by changes in the height of table object 100b and are thus subject to vertical displacement by an amount equal to a change in the height of table objects 100b.

Objects 80d are effectively subject to changes in the vertical sizing of both table objects 100a and 100b due to being beneath an object 80b and an object 80c. Thus, as discussed in other examples, the objects 80d will be displaced vertically by the larger change in height of table objects 100a or 100b. That is, if the table object 100a is increased in size in the vertical dimension to a greater extent than the table object 100b, the objects 80d will be displaced vertically by the amount that the table object 100a is increased in height.

Figure 17:
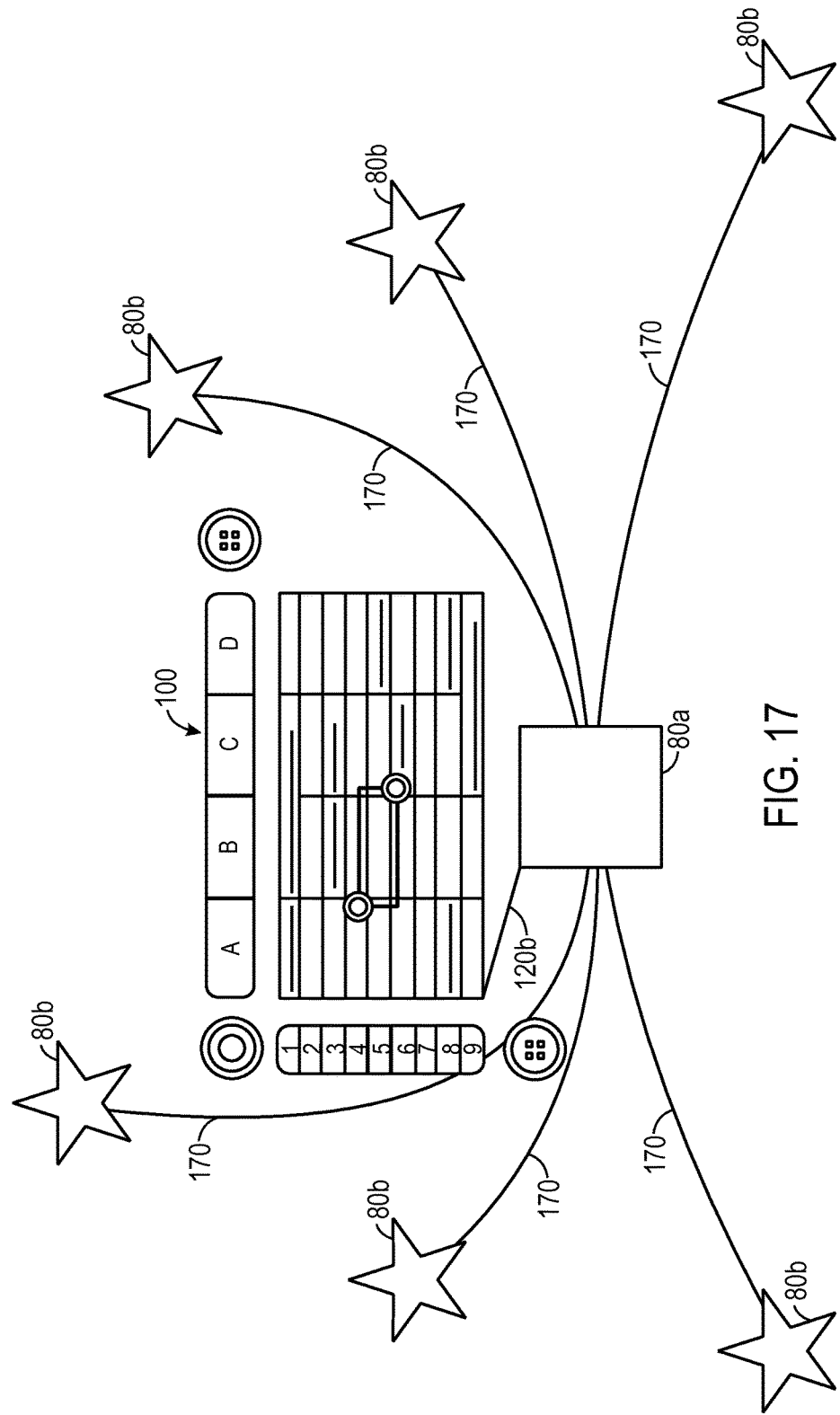
FIG. 17 depicts an application work space on which a table object is positioned along with a plurality of other objects, some of which are connected by connecting lines, in accordance with aspects of the present disclosure.

While the foregoing discussion relates to various objects, including table objects 100, that may be placed and moved on an application work space 102, it should also be appreciated that other, secondary structures may also be present. For example, turning to FIG. 17, a table object 100 is depicted that is positioned above a graphical object 80a, as discussed above. In the depicted example, additional objects 80b are depicted to the respective sides of table object 100, such that changes that resize the table object 100 in the vertical dimension would not affect placement of the additional objects 80b. However, the object 80a, situated beneath the table object 100, would be displaced in response to the table object 100 being resized in the vertical dimension so as to maintain offset 120b.

Figure 18:
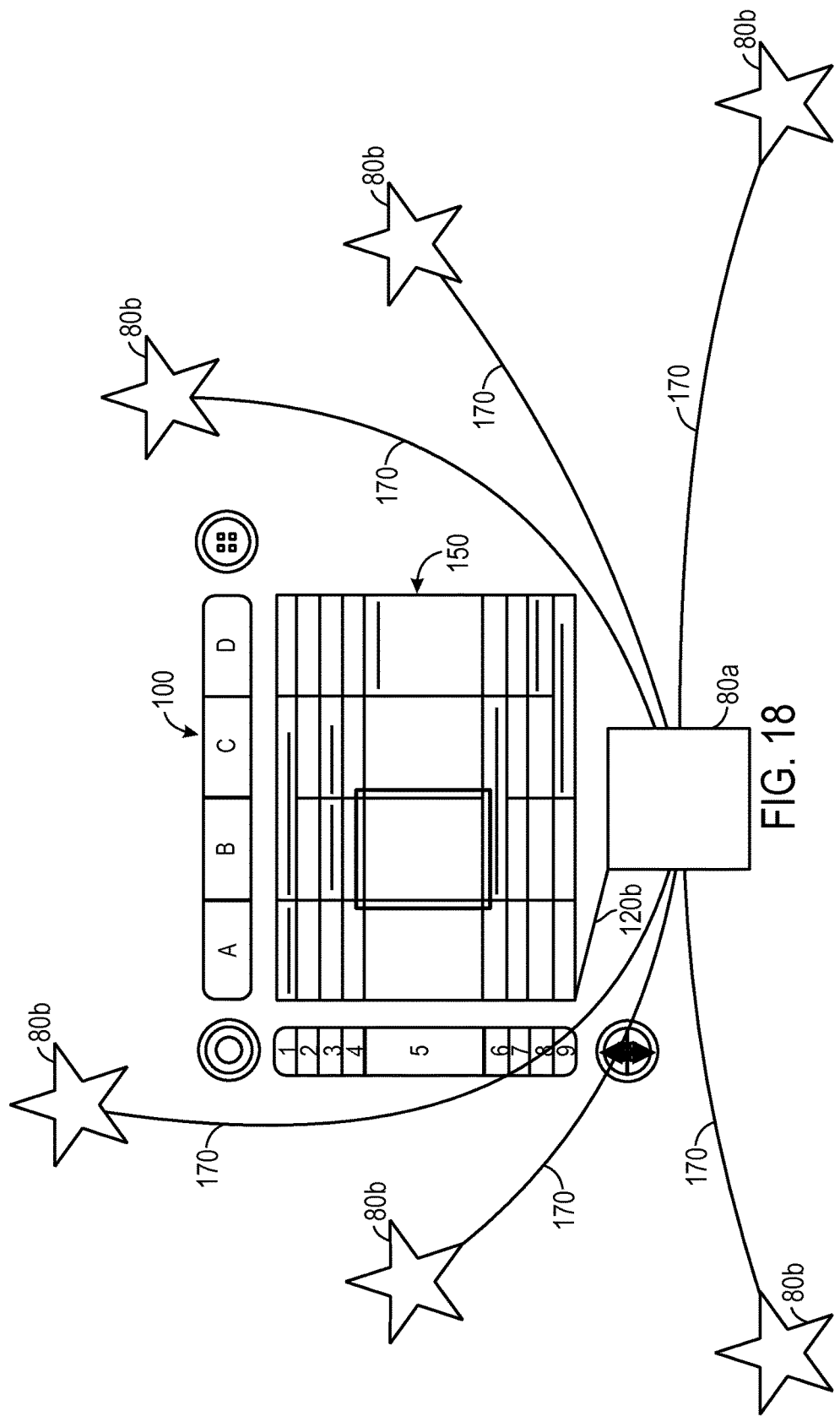
FIG. 18 depicts the table object and connected objects of FIG. 17 after a row of the table object is resized, in accordance with aspects of the present disclosure.

In the depicted example, the additional objects 80b are each connected to the object 80a via a respective connector line 170 (e.g., a line that connects a connection point on each additional object 80b to a corresponding connection point on the object 80a). Turning to FIG. 18, in the depicted example a selected row 150 of the table object 100 is increased in height. As discussed herein, the object 80a is vertically displaced by an amount equivalent to the increased height of the table object 100 so as to maintain the offset 120b. Additional objects 80b are not vertically displaced as they are not directly or indirectly beneath the table object 100 that was resized. However, because the object 80a is vertically displaced relative to the additional object 80b and because the object 80 is connected to each of the additional objects 80b by a respective connector line 170, the respective connector lines 170 may be elongated or otherwise resized so as to maintain the connection between the displaced and the non-displaced objects. In this manner, user specified connections between objects may be maintained even when elements of a table objects 100 are resized, resulting in displacement of certain of the connected objects.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for modifying positions of displayed objects in response to changes in a table object, the method comprising:
displaying, on a screen of an electronic device, the table object and one or more graphical reference objects on a work space associated with an application running on the electronic device, wherein each of the one or more graphical reference objects has a designated tracking point defined based on a shape of the respective graphical reference object such that when the respective graphical object has a pointer region the tracking point comprises a tip of the pointer region;

determining an offset between each tracking point and a respective designated point on the table object, wherein the offset for tracking points displayed on top of the table object is determined based on a referenced cell of the table object and the offset for tracking points displayed outside the boundary of the table object is determined based on a non-cell feature of the table object;

receiving an input changing dimensions of the table object;

in response to the change in the dimensions of the table object, automatically moving the one or more graphical reference objects on the work space to maintain the respective offset between each graphical reference object and the table object.

2. The method of claim 1, wherein the offset for tracking points intersecting the table object is determined based on a corner of the referenced cell relative to the respective tracking point.

3. The method of claim 1, wherein the offset for tracking points outside the table object is determined based on a corner of the table object relative to the respective tracking point.

4. The method of claim 1, where the offset for tracking points outside the table object is determined based on whether the respective tracking point is to the right of or beneath the table object.

5. A processor-implemented method for maintaining a layout of one or more graphical reference objects displayed with a table object, the method comprising:

determining whether a tracking point of each graphical reference object is displayed outside the boundary of the table object or within the boundary of and over the table object, wherein the respective tracking point of each graphical reference object is determined based on a shape of the respective graphical reference object such that when the respective graphical object has at least one corner the tracking point comprises one of the corners;

for each graphical reference object:
when a tracking point of a respective graphical reference object is determined to be displayed outside the boundary of the table object, determining an offset for the respective graphical reference object as defined by the position of the tracking point of the respective graphical reference object with respect to a boundary or corner of the table object;
when the tracking point of the respective object is determined to be displayed inside the boundary of and over the table object, determining the offset for the respective graphical reference object as defined by the position of the tracking point of the respective object with respect to a boundary or corner of a referenced cell of the table object, wherein the referenced cell is determined based on the location of the respective tracking point; and
automatically maintaining a spatial relationship of the displayed table object and one or more graphical reference objects when the table object is changed in size, wherein the spatial relationship is maintained using the respective offset determined for each graphical object.

6. The processor-implemented method of claim 5, wherein for tracking points determined to be displayed outside the boundary of the table object, additionally determining whether the respective tracking point is displayed above, to the right of, to the left of, or below the table object.

7. The processor-implemented method of claim 6, wherein for tracking points determined to be to the right of the table object, the offset for the respective object is defined by the position of the tracking point of the respective object with respect to a right corner of the table object.

8. The processor-implemented method of claim 6, wherein for tracking points determined to be below the table object, the offset for the respective object is defined by the position of the tracking point of the respective object with respect to a bottom corner of the table object.

9. The processor-implemented method of claim 5, wherein for tracking points determined to be displayed inside the boundary of the table object, the offset for the respective object is defined by the position of the tracking point within the referenced cell with respect to an upper left corner of the referenced cell.

10. A method for repositioning a plurality of objects displayed in an application work space, the method comprising:

displaying a table object on the application work space, wherein the work space is not itself comprised of a grid of spreadsheet cells;

displaying the plurality of objects on the application work space, wherein the plurality of objects are separate and distinct from the table object and do not share a common cell matrix with the table object;

receiving an instruction that will result in the table object being resized in a vertical or horizontal dimension;

based on the instruction to resize the table object, identifying one or more objects of the plurality of objects that are, completely or partly, within a region directly under, when the table object is being resized in the vertical dimension, or directly to the right of, when the table object is being resized in the horizontal dimension, the table object;

identifying one or more additional objects that are, completely or partly, within an additional region of the work space directly under, when the table object is being resized in the vertical dimension, or directly to the right of, when the table object is being resized in the horizontal dimension, the one or more identified objects; and repositioning the identified one or more objects and additional objects based on the extent to which the table object is resized in the vertical or horizontal dimension, wherein repositioning the identified one or more objects and additional objects is based on a respective offset derived for each of the one or more objects and additional objects with respect to a respective feature of the table object, wherein the offset is determined based upon the spatial relationship between a respective tracking point of each of the one or more objects and additional objects and the respective feature of the table object, wherein the respective tracking point of each of the one or more objects and additional objects is based on a shape of the respective object or additional object such that when the respective graphical object has a pointer region the tracking point comprises a tip of the pointer region.

11. The method of claim 10, comprising:
displaying an additional table object on the application work space;
receiving an additional instruction that will result in the additional table object being resized in the vertical or horizontal dimension;
repositioning some or all of the identified one or more objects and additional objects based on whichever of the table object or the additional table object is resized to a greater extent such that the repositioned objects are only moved based upon the resizing of one, not both, of the table objects.

12. The method of claim 10, wherein the respective offset is derived based on the tracking point of each respective object and boundary or corner of the table object.

13. The method of claim 12, wherein the respective offset is derived based on the tracking point of each respective object and a corner of the table object such that, for tracking points to the right of the table object, the respective offset is derived based on the location of the respective tracking point and a right corner of the table object, and for tracking points below the table object, the respective offset is derived based on the location of the respective tracking point and a bottom corner of the table object.

14. A processor-based system, comprising:
a display;
a memory storing one or more routines; and
a processing component configured to execute the one or more routines stored in the memory, wherein the one or more routines, when executed by the processing component, cause acts to be performed comprising:
displaying, on the display, a table object and one or more objects on a virtual canvas of an application,
determining a respective offset between each object and the table object, wherein each respective offset comprises one or both of a horizontal component and a vertical component defined by the initial position of a tracking point of each respective object and a feature of the table object, wherein the respective tracking point of each object is determined based on a shape of the respective object such that when the respective graphical object has a pointer region the tracking point comprises a tip of the pointer region,
wherein the feature of the table object used to determine each offset is determined by an initial location of the respective tracking point such that:
when the initial location of the respective tracking point is within the boundary of and over the table object, the feature is a corner or boundary of a table cell in which the respective tracking point is located;
but when the initial location of the respective tracking point is outside the boundary of the table object, the feature is a corner or boundary of the table object; and
automatically moving the one or more objects on the virtual canvas to maintain the respective offsets when the table objects is resized in the horizontal or vertical dimension.

15. The processor-based system of claim 14, wherein the respective offset for tracking points within the boundary of the table object is determined based on the horizontal and vertical displacement of the respective tracking point relative to a corner of the table cell in which the respective tracking point is located.

16. The processor-based system of claim 14, wherein the respective offset for tracking points outside the boundary of the table object is determined based on the horizontal and vertical displacement of the respective tracking point relative to a corner of the table object.

17. The processor-based system of claim 14, wherein the respective offset for tracking points outside the boundary of the table object is determined based on whether the respective tacking point is to the right of or beneath the table object.

18. The processor-based system of claim 17, wherein the respective offset for tracking points outside the boundary of the table object is determined based on the horizontal and vertical displacement of the respective tracking point relative to a right corner of the table object when the tracking point is to the right of the table object.

19. The processor-based system of claim 17, wherein the respective offset for tracking points outside the boundary of the table object is determined based on the horizontal and vertical displacement of the respective tracking point relative to a bottom corner of the table object when the tracking point is beneath the table object.

20. A non-transitory, computer-readable medium storing one or more instructions executable by a processor of an electronic device, the instructions, when executed, performing acts comprising:
displaying, on a screen of an electronic device, a table object and one or more graphical reference objects on a work space associated with an application running on the electronic device, wherein each of the one or more graphical reference objects has a designated tracking point defined based on a shape of the respective graphical reference object such that when the respective graphical object has a pointer region the tracking point comprises a tip of the pointer region;
determining an offset between each tracking point and a respective designated point on the table object, wherein the offset for tracking points displayed on top of the table object is determined based on a referenced cell of the table object and the offset for tracking points displayed outside the boundary of the table object is determined based on a non-cell feature of the table object;
receiving an input changing dimensions of the table object;
in response to the change in the dimensions of the table object, automatically moving the one or more graphical reference objects on the work space to maintain the respective offset between each graphical reference object and the table object.

21. The non-transitory, computer-readable medium of claim 20, wherein the respective designated point comprises a corner or boundary of the referenced cell when the respective tracking point is within the boundary of the table object.

22. The non-transitory, computer-readable medium of claim 20, wherein the non-cell feature comprises a right corner or boundary of the table object when the respective tracking point is outside and to the right of the boundary of the table object.

23. The non-transitory, computer-readable medium of claim 20, wherein the non-cell feature comprises a bottom corner or boundary of the table object when the respective tracking point is outside and below the boundary of the table object.

24. The method of claim 1, wherein:
when the respective graphical object does not include a pointer region but includes one or more corners, the tracking point comprises one of the corners;

when the respective graphical object does not include a pointer region or corners, the tracking point comprises an edge of the respective graphical object or a point defined on an imaginary boundary outlining a space envelope of the respective graphical object.

\* \* \* \* \*